United States Patent [19]

Inoue et al.

[11] Patent Number: 4,834,640

[45] Date of Patent: May 30, 1989

[54] EXTRUSION-FORMING JIG

[75] Inventors: Satoru Inoue, Aichi; Mitsuaki Watanabe, Inazawa, both of Japan

[73] Assignee: NGK Industries, Ltd., Japan

[21] Appl. No.: 156,886

[22] Filed: Feb. 18, 1988

[30] Foreign Application Priority Data

Feb. 27, 1987 [JP] Japan .................................. 62-43179

[51] Int. Cl.$^{4}$ ................................................ B29F 3/04

[52] U.S. Cl. .................................... 425/464; 164/138; 264/177.11; 264/177.12; 425/DIG. 29; 427/35; 427/37

[58] Field of Search ........................... 427/399, 35, 39; 425/461, 466, DIG. 29; 75/128 B; 164/138; 264/177.11, 177.12

[56] References Cited

U.S. PATENT DOCUMENTS 3,905,743 9/1975 Bagley ................................ 425/464
3,912,827 10/1975 Komatsu et al. .................... 427/399
4,322,922 4/1982 Gilliam ................................. 51/325
4,551,603 11/1985 Rocklin ........................... 219/76.13
4,653,996 3/1987 Ozaki et al. ......................... 425/461

FOREIGN PATENT DOCUMENTS 49-8559 1/1974 Japan ............................. 264/177.12

OTHER PUBLICATIONS

Krainer, E.; Schindler, A.; Stuhl, J. Metall, 27(2), 121-6, 1973.

*Primary Examiner*—Jay H. Woo
*Assistant Examiner*—Khanh P. Nguyen
*Attorney, Agent, or Firm*—Arnold, White & Durkee

[57] ABSTRACT

An extrusion-forming jig for extruding a ceramic batch to regulate a sectional shape and external dimensions of a honeycomb structure is formed by the extrusion. The jig includes electric discharge coating layers on surfaces of the jig contacting the ceramic batch. The electric discharge coating layers are made of a cemented carbide such as tungsten carbide. The jig is able to be used for many hours without necessitating replacement.

3 Claims, 2 Drawing Sheets

EXTRUSION-FORMING JIG

BACKGROUND OF THE INVENTION

This invention relates to an extrusion-forming jig for use in extruding a ceramic material to form ceramic honeycomb structures.

Extrusion-forming jigs such as masks, rings and the like have been used, at a location downstream of dies for extruding ceramic materials to form honeycomb structures. As disclosed in, for example, Japanese Utility Model Application Laid-open No. 49-8,559, such jigs are used to form outer walls of honeycomb structures made of ceramic batches, or the like, passing through dies, or to regulate sectional shapes and external dimensions of honeycomb structures.

The surfaces of such extrusion-forming jigs contact ceramic batches and are likely to be abraded. However, honeycomb structures are required to be formed within extreme dimensional tolerances. Therefore it has been necessary to treat at least the surfaces of the jigs which contact ceramic batches by surface treatments such as plating, to obtain wear-resistant surfaces.

However, even if the surfaces of the jigs contacting ceramic batches are treated by surface treatments such as plating for the purpose of improving the wear-resistance of the jigs, the improved wear-resistance is not always sufficient. Therefore, extrusion-forming jigs having much higher wear-resistance have been desired for many years.

In the case of applying a surface treatment to jigs in the conventional manner, however, the jigs are generally treated at high temperatures. Therefore, strains were produced in the surfaces of jigs which were subjected to such a surface treatment thus detrimentally affecting their dimensions and accuracy. As a result, it is disadvantageously required to correct the altered dimensions and accuracy of the jigs. Moreover surface treatments such as plating increase the man-hours necessary for producing the jigs.

SUMMARY OF THE INVENTION

It is an object of the present invention to provide an extrusion-forming jig which eliminates all the disadvantages of the prior art and has a much higher wear-resistance which is improved in a simple manner.

In order to achieve this object, the extrusion-forming jig for use in extruding a ceramic batch to regulate a sectional shape and external dimensions of a honeycomb structure formed by the extrusion according to the invention comprises electric discharge coating layers on surfaces of the jig contacting the ceramic batch.

The electric discharge coating layers are preferably made of a cemented carbide.

According to the invention, electric discharge coating layers preferably made of a cemented carbide such as tungsten carbide of a thickness of 10–60 μm are applied onto inner diameter portions of the jigs which contact ceramic batches while forming honeycomb structures by extruding, thereby obtaining high wear-resistance enabling the jig to be used for many hours without requiring that the jig be replaced.

The electric discharge coating layers have a diffusion property to exhibit a strong attaching force to the jigs. Moreover, the electric discharge coating layers can be locally applied to the jigs with ease. Therefore, such coating layers are best for the extrusion-forming jigs.

In order that the invention may be more clearly understood, preferred embodiments will be described, by way of example, with reference to the accompanying drawings.

DESCRIPTION OF THE PREFERRED EMBODIMENTS

Figure 1:
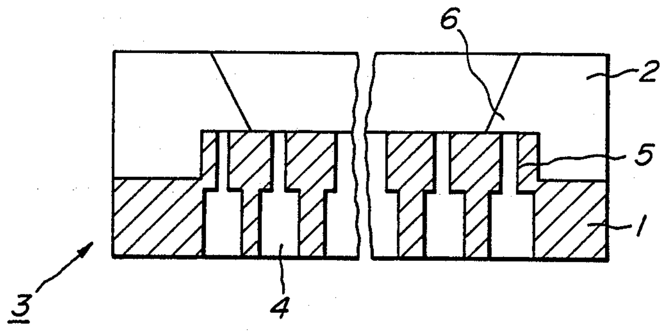
FIG. 1 is a sectional view illustrating one embodiment of a honeycomb structure extruding die equipped with an extrusion-forming jig according to the invention.

FIG. 1 is a sectional view illustrating one embodiment of a die assembly equipped with the extrusion-forming jig according to the invention for extruding a ceramic material to form honeycomb structures. In the embodiment shown in FIG. 1, the die assembly 3 for extruding the ceramic material comprises an extruding die 1 and an extrusion-forming jig 2 provided downstream of the extruding die 1. With this arrangement, a ceramic batch is supplied into material supply apertures 4 of the extruding die 1 and forced through slits 5 in the form of a grid to form cells of a honeycomb structure. The ceramic batch is then forced through the extrusion-forming jig 2 to form outer walls of the honeycomb structure so as to complete the honeycomb structure.

Figure 2:
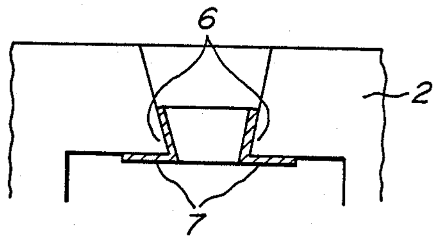
FIG. 2 is a sectional view for displaying the inner diameter portion of the extrusion-forming jig according to the invention.

As a result, an inner diameter portion 6 of the extrusion-forming jig 2 contacting the ceramic batch regulates the sectional shape of the structure and external shape and dimension of the outer walls. According to the invention, electric discharge coating layers 7 are provided on the inner diameter portion to improve the wear-resistance of the inner diameter portion. Namely, as shown in detail in FIG. 2, the inner diameter portion 6 is provided with the electric discharge coating layers 7 having a thickness of 10–60 μm by the use of a commercially available electric discharge coating apparatus. The coating layers are preferably of a cemented carbide such as tungsten carbide. The "electric discharge coating apparatus 720" manufactured by Stanley-IJR is preferably used for this purpose. The electric discharge layers 7 could be simply formed by causing electric discharge at the relevant surfaces of the extrusion-forming jig 2 from an electrode made of a cemented carbide in the apparatus.

An actual example will be explained hereinafter.

EXAMPLE

Three kinds of extrusion-forming jigs 2, such as shown in FIG. 1, were prepared. They were the jigs of the prior art made of an untempered steel of JIS (Japanese Industrial Standard) SKD-61, the jigs of the prior art made of the untempered steel of JIS SKD-61 whose inner diameter portions were subjected to a nitriding treatment, and the jigs made of the untempered steel of JIS SKD-61 whose inner diameter portions were provided with electric discharge coating layers 7 of tungsten carbide according to the invention. These extrusion-forming jigs 2 were mounted on an extruding end of a ceramic batch extruding apparatus and used for actually extruding ceramic batches. Relations between amounts of extruded ceramic batches and amounts of wear at the inner diameter portions of the jigs were measured. The amounts of wear were determined by differences in diameters before and after extruding predetermined amounts of the ceramic batch. Results are shown in FIG. 3.

Figure 3:
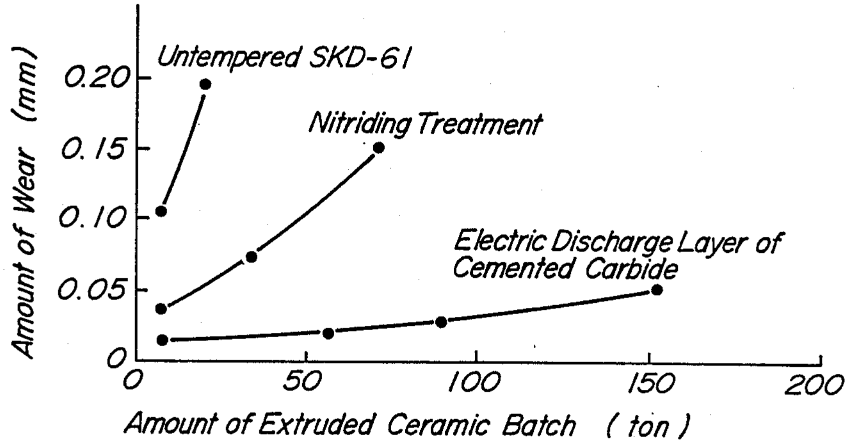
FIG. 3 is a graph illustrating relations between amounts of extruded ceramic batches and amounts of wear of jigs prior art and jigs according to the invention.

As can be seen from the results in FIG. 3, the jigs of the prior art made of the untempered steel of JIS SKD-61 were worn 0.2 mm when the 20 tons ceramic batches had been extruded through the jigs, and even the jigs of the prior art whose surfaces at the inner diameter portions were treated by the nitriding treatment were worn 0.15 mm when 70 tons of ceramic batch had been extruded therethrough. On the other hand, the jigs provided with electric discharge coating layers 7 according to the invention were worn only 0.05 mm when 150 tons of the ceramic batch had been extruded.

As can be seen from the explanation as above described, by applying the electric discharge coating layers preferably made of cemented carbide such as tungsten carbide, to the surfaces of the jigs contact the ceramic batches in this simple manner, the extrusion forming jigs according to the invention exhibit high wear-resistance which enables the jigs to continue extruding ceramic batches for many hours without requiring replacement of the jigs.

It is further understood by those skilled in the art that the foregoing description is that of preferred embodiments of the disclosed jigs and that various changes and modifications may be made in the invention without departing from the spirit and scope thereof.

What is claimed is:

1. An extrusion-forming jig for regulating a sectional shape and external dimension of a honeycomb structure formed by extruding a ceramic batch through an extrusion die, said jig comprising electric discharge coating layers formed on surfaces of said jig which contact said ceramic batch, said coating layers comprising a cemented carbide.

2. An extrusion-forming jig according to claim 1, wherein said cemented carbide consists essentially of tungsten carbide.

3. An extrusion-forming jig according to claim 1, wherein said coating layers have a total thickness of about 10–60 μm.

* * * * *

UNITED STATES PATENT AND TRADEMARK OFFICE

CERTIFICATE OF CORRECTION

PATENT NO. : 4,834,640

DATED : May 30, 1989

INVENTOR(S) : Satoru INOUE et al.

It is certified that error appears in the above-identified patent and that said Letters Patent is hereby corrected as shown below:

At item [73], change "Assignee: NGK Industries, Ltd., Japan" to --Assignee: NGK Insulators, Ltd., Japan--.

Signed and Sealed this

Twentieth Day of March, 1990

*Attest:*

JEFFREY M. SAMUELS

*Attesting Officer*

*Acting Commissioner of Patents and Trademarks*